United States Patent [19]

Nossem

[11] 4,319,273

[45] Mar. 9, 1982

[54] TELEVISION SIGNAL WITH ENCODED SYNCHRONIZING SIGNALS

[75] Inventor: Edward J. Nossem, Cherry Hill, N.J.

[73] Assignee: RCA Corporation, New York, N.Y.

[21] Appl. No.: 88,511

[22] Filed: Oct. 26, 1979

[51] Int. Cl.³ ............................................ H04N 7/16
[52] U.S. Cl. ..................................... 358/120; 358/152
[58] Field of Search ................ 358/120, 148, 150, 151

[56] References Cited

U.S. PATENT DOCUMENTS

| | | | |
|---|---|---|---|
| 3,081,376 | 3/1963 | Loughlin et al. | 358/120 |
| 3,485,941 | 12/1969 | Bass | 358/120 |
| 3,530,232 | 9/1970 | Reiter et al. | 358/120 |
| 3,666,888 | 5/1972 | Sekimoto | 358/150 |
| 3,688,037 | 8/1972 | Ipri | 358/158 |
| 3,777,063 | 12/1973 | Meacham | 358/150 |
| 3,919,462 | 11/1975 | Hartung et al. | 358/124 |
| 4,068,264 | 1/1978 | Pires | 358/122 |
| 4,070,693 | 1/1978 | Shutterly | 358/123 |
| 4,121,242 | 10/1978 | Janko | 358/4 |

*Primary Examiner*—S. C. Buczinski
*Attorney, Agent, or Firm*—Samuel Cohen; Robert L. Troike; Donald W. Phillion

[57] ABSTRACT

A television system including a transmitter and a receiver and first logic means in said transmitter for generating a composite video signal whose only synchronizing signals consist of coded signals occurring during a predetermined portion of the vertical blanking periods of said television signal. A second logic means at said receiver detects said coded signals by correlation means and then generates and substitutes for said coded signals conventional vertical and horizontal synchronizing pulses.

12 Claims, 11 Drawing Figures

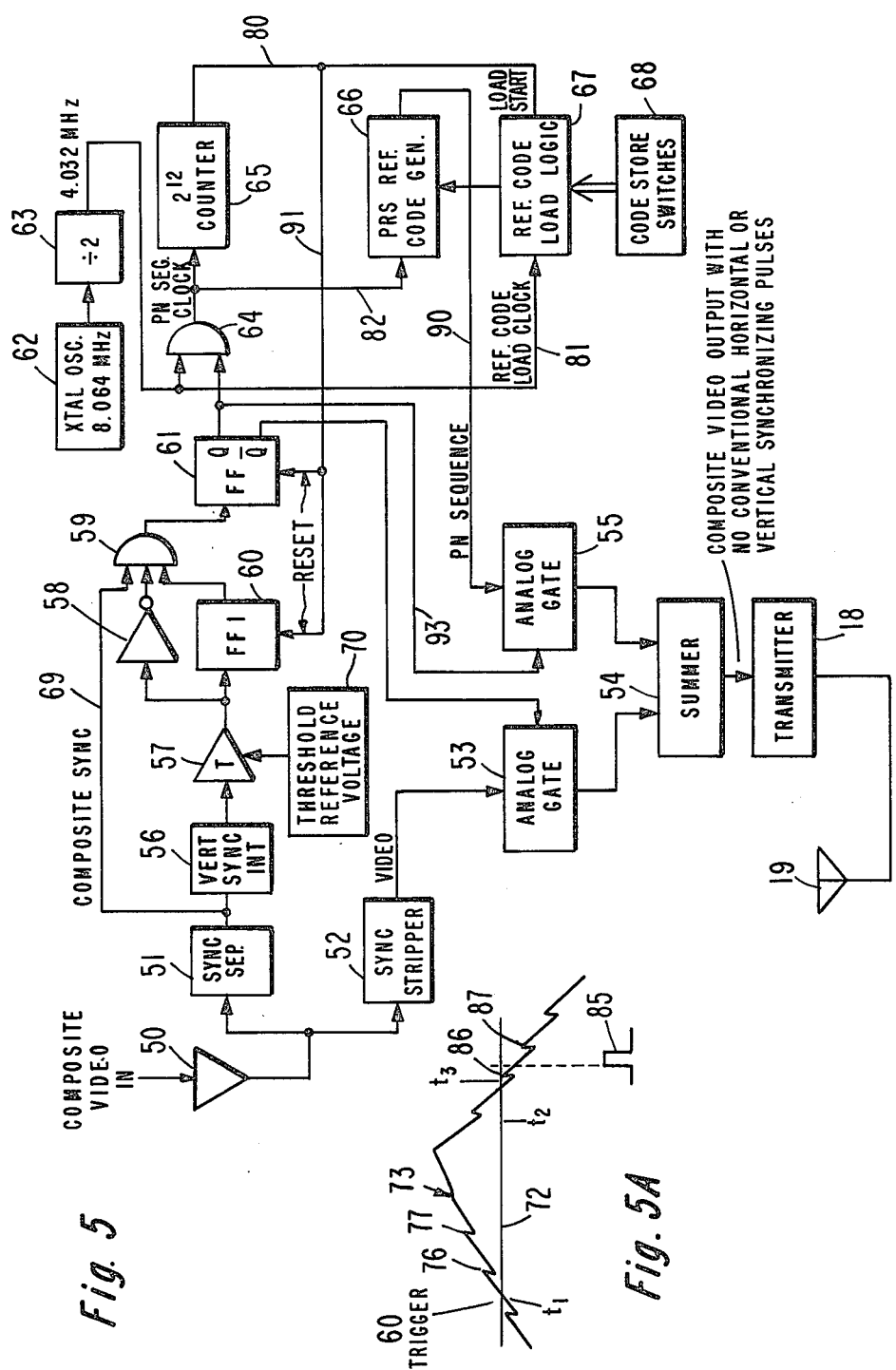

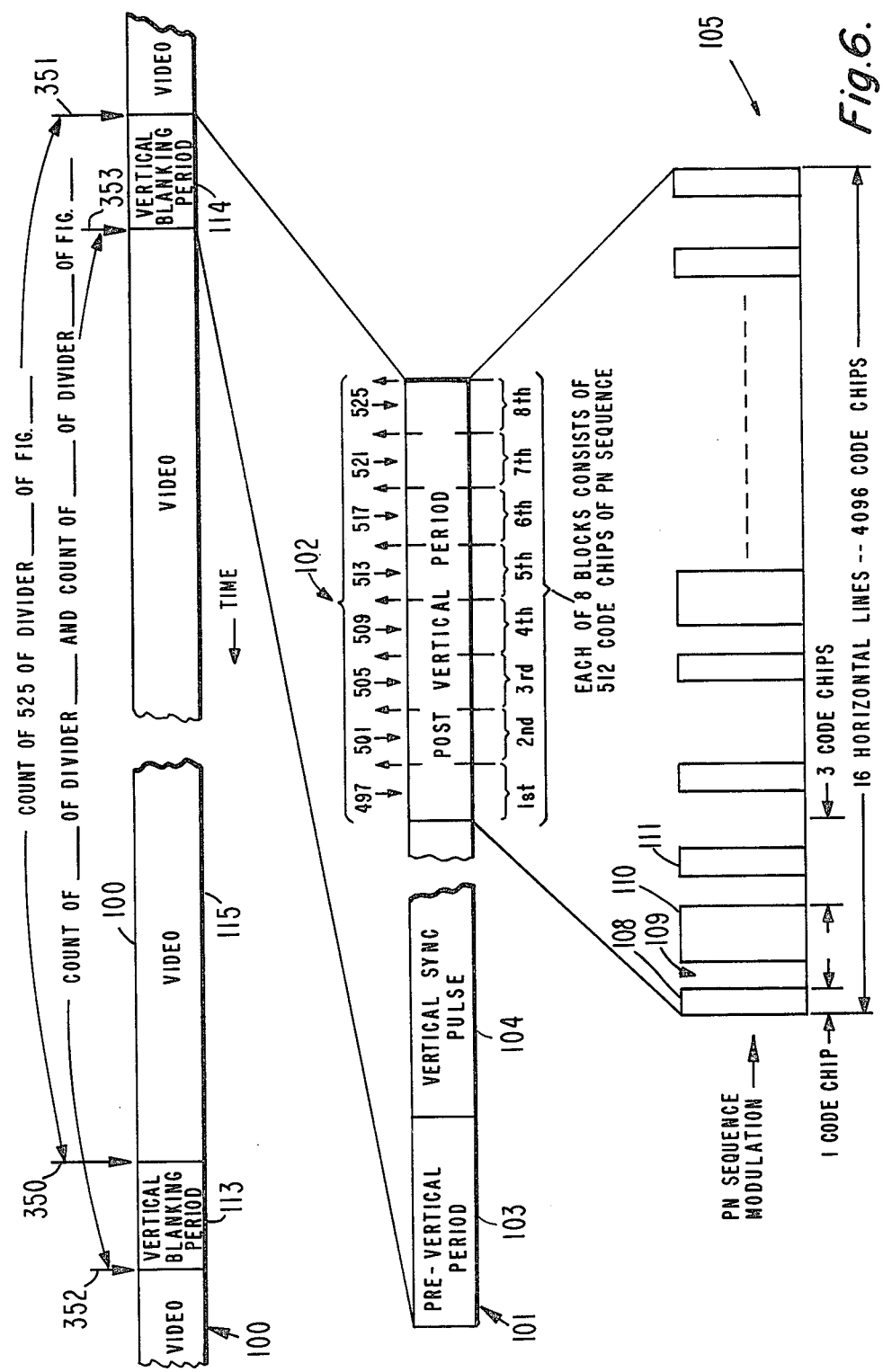

TELEVISION SIGNAL WITH ENCODED SYNCHRONIZING SIGNALS

This invention relates generally to television systems and more particularly to a system wherein the synchronizing pulses are encoded to avoid unauthorized reception of transmitted television signals and to provide security from jamming when employed in military applications.

It is current practice in the television industry to relay television signals through satellites with the retransmitted signal being detected in remote areas of the United States not having adequate local television transmitting facilities, as for example, Alaska. Thus, an Alaskan cable television company might have a contract with a television network to receive programs via satellite and then to retransmit them to receivers in the Alaskan area. However, unless some type of encoding of the transmitted television signals is employed it is apparent that unauthorized persons not having contractual right to receive and retransmit the programs could easily do so with a relatively small capital investment in equipment. While it is possible to prevent such unauthorized usage of the transmitted signals by legal means, such remedies are expensive and, in some countries, might not be illegal.

In another current practice television networks provide their affiliates throughout the country with productions weeks in advance of their scheduled airing time so that the affiliates can insert the proper advertisements, local station announcements, etc. Traditionally, this has been done by shipping the taped television programs throughout the country via plane or other suitable means. Such means of delivery of tapes is not only time consuming but also requires the making of at least as many tapes as the network has affiliates.

An alternative procedure now being considered is to transmit the programs via satellites a few weeks in advance. The transmissions are received and taped by the affiliates, and then edited to comply with each affiliates' particular requirements. Again, unless some type of encoding is employed, it is possible for unauthorized persons to intercept the transmitted signals and air them locally, perhaps even in advance of the scheduled airing time of authorized retransmissions.

The need for encoding transmitted television signals also arises in military communications where security against jamming is sometimes required.

It is a primary object of the present invention to encode the vertical and horizontal synchronizing pulses of a transmitted television signal in such a manner as to minimize the chances of unauthorized use and also to minimize the possibility of jamming.

In accordance with a preferred form of the invention there is provided a television system having a transmitter and a receiver. A first logic means at the transmitter generates a composite video signal with synchronizing signals that consist of a code (as, for example, a pseudo random sequence) which occurs during a predetermined portion of the vertical blanking period of said video signal. A second logic means at said receiver is responsive to said code to generate and substitute therefore conventional vertical and horizontal signals.

In the drawings:

FIG. 5 is a more detailed block diagram of the transmitting portion of the system;

FIG. 5A is a waveform showing the regeneration of a portion of the synchronizing signal.

FIG. 6 shows the relationship of the PRS encoded vertical synchronizing pulses to the overall video signal and also shows such PRS encoded portion divided into blocks selectable by the receiver to minimize jamming of the received signal;

Figure 7A:
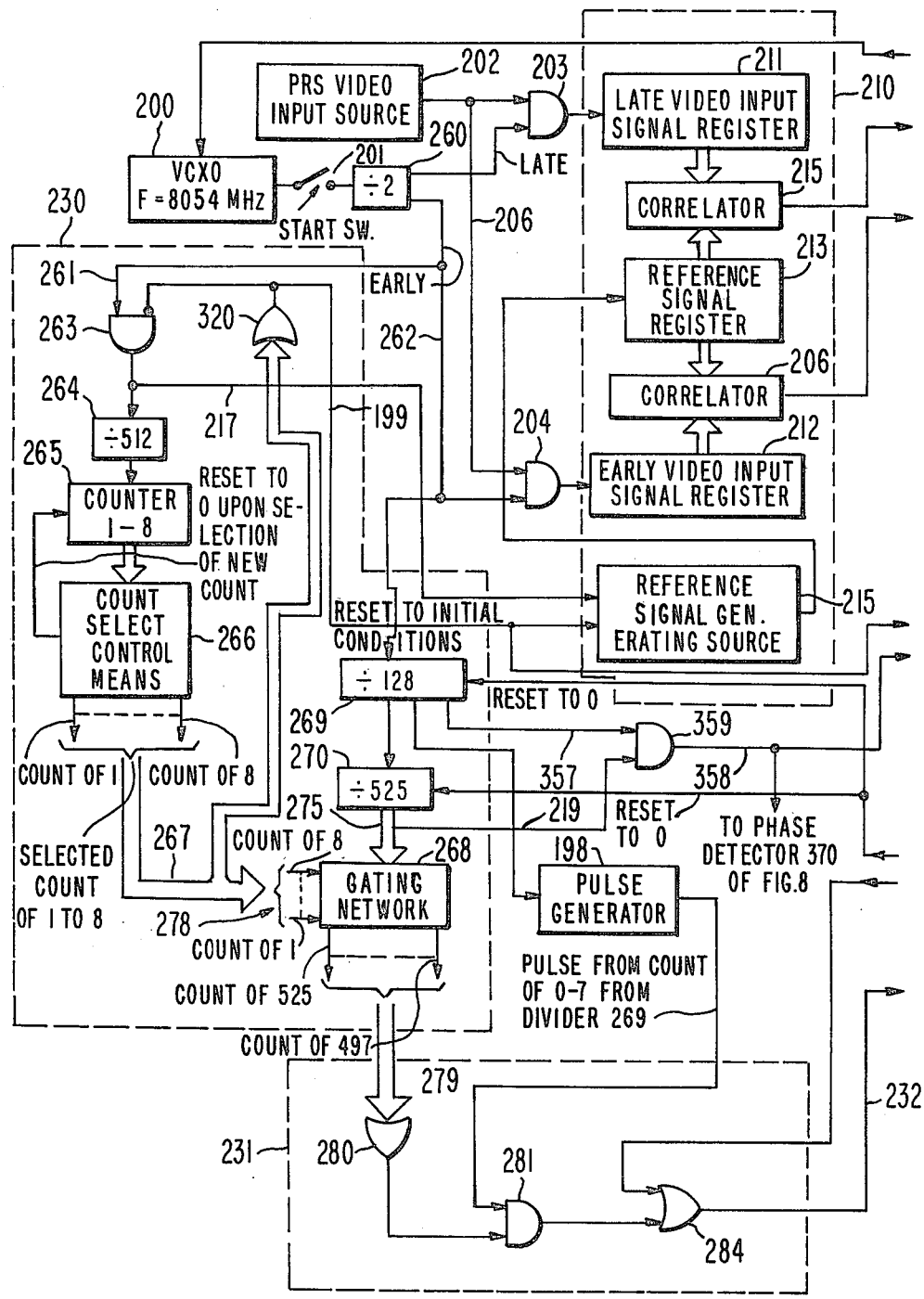
Figures 7B, 7C:
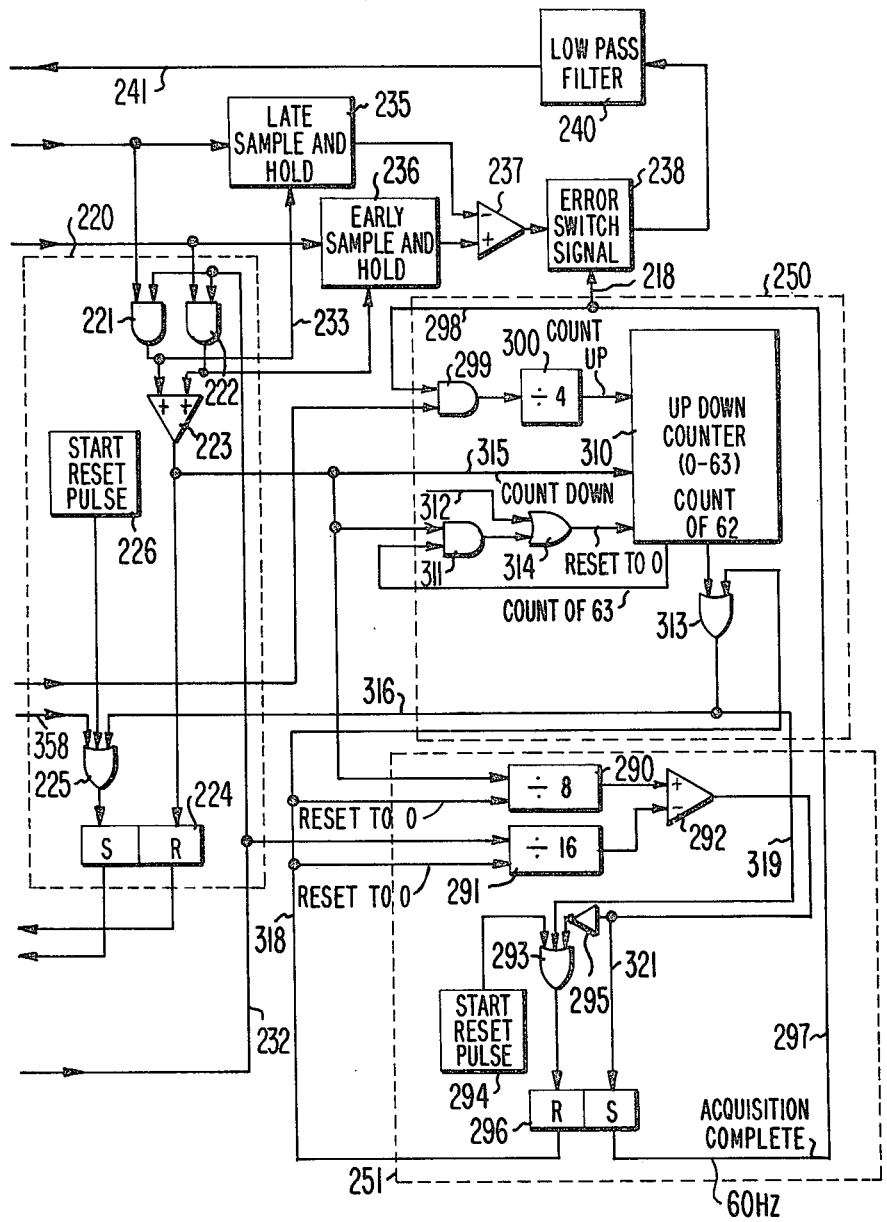

FIGS. 7A and 7B together show a combination block and logic diagram of the receiving portion of the system and will be referred to as FIG. 7 in the specification;

FIG. 7C shows how FIGS. 7A and 7B fit together; and

Figure 8:
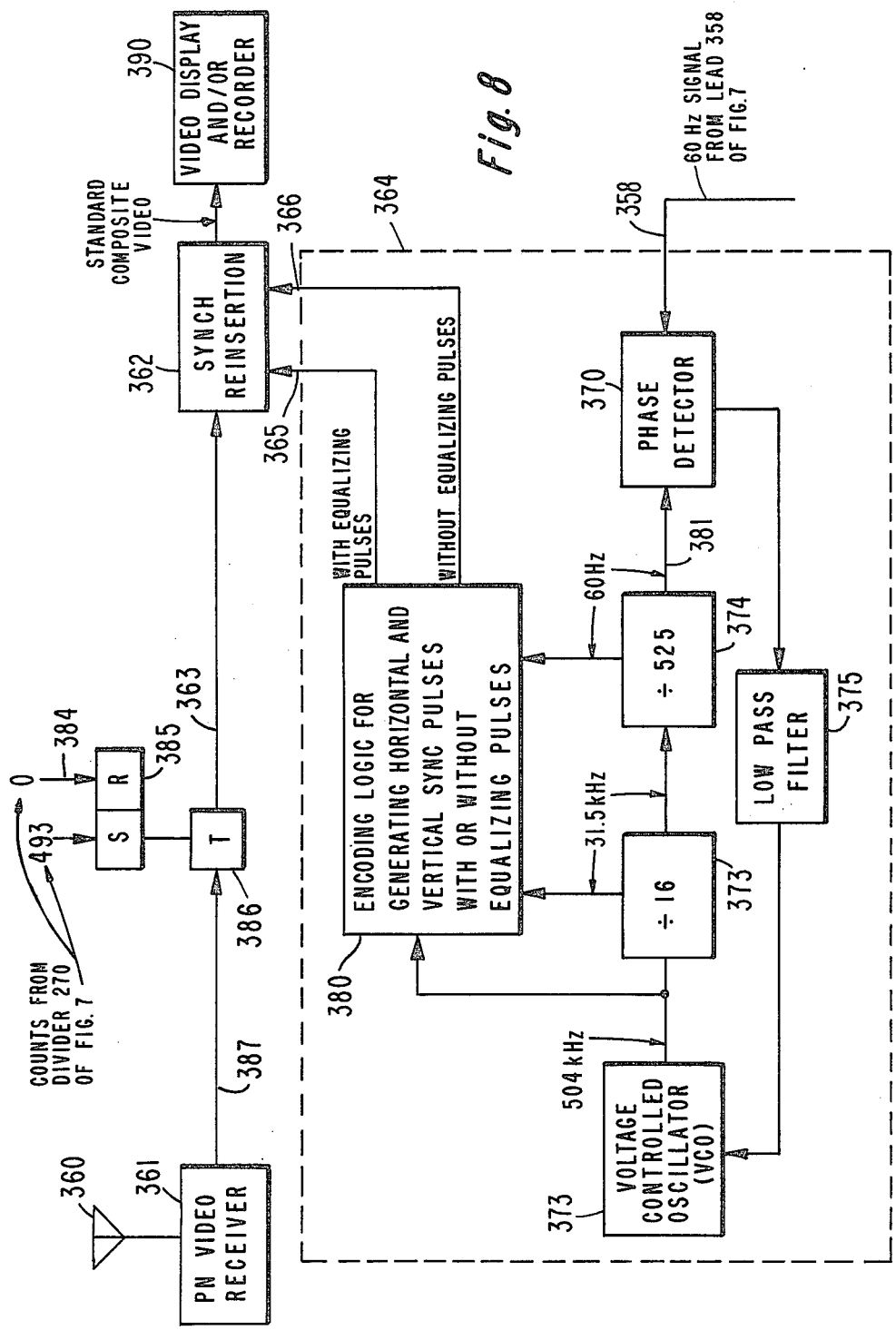

FIG. 8 is another block diagram showing additional portions of the receiving portion of the system.

Figure 1:
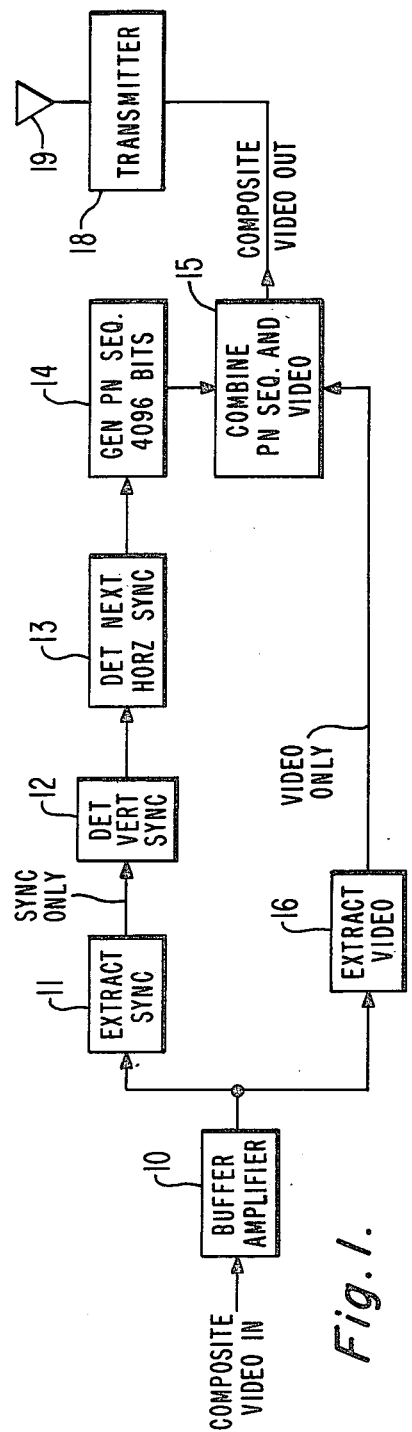
FIG. 1 is a generalized block diagram of the transmitting portion of the system.

Referring now to FIG. 1 a standard composite video signal with standard vertical and horizontal sync pulses is supplied to a buffer amplifier 10, the output of which is then supplied to two separate circuit paths. One circuit path extracts the video portion only by means of circuitry within the block 16 and the other circuit path extracts the vertical and horizontal synchronizing pulses by means of appropriate circuitry within block 11. The vertical synchronizing pulses are detected in block 12 and the first horizontal synchronizing pulse following each vertical synchronizing pulse is detected in block 13. The remaining horizontal synchronizing pulses are not used and in fact are eliminated from the signal.

A pseudo random sequence (PRS) consisting of 4096 code chips is generated at a chip rate of 4.032 MHz in block 14 and combined with the video signal in block 15. A code chip is the smallest time synchronizing portion of an encoded signal and ordinarily carries no intelligence; performing only a keying function. All of the horizontal synchronizing pulses have been previously removed, as stated above. The output of combining circuit means 15 then consists of a composite video signal containing only an encoded PRS vertical synchronizing signal which consists of a pseudo random sequence having 4096 code chips. Such composite video signal is supplied to transmitter 18 to modulate a carrier signal which is then transmitted via antenna 19. As will be discussed later in detail, the 4096 code chip pseudo random sequence occurs during the post vertical blanking period 28 of FIG. 2 (also shown as portion 21' of FIG. 4).

Figure 4:
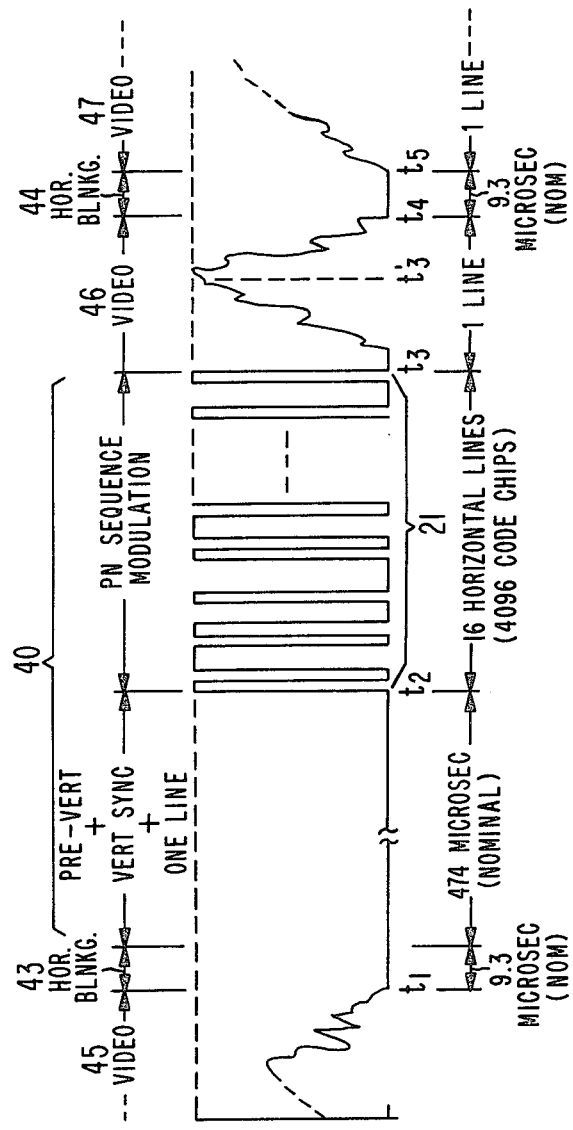
FIG. 4 is another waveform showing the vertical blanking period and that portion thereof in which a pseudo random sequence (PRS) signal has been encoded after removal of the standard vertical and horizontal synchronizing signals.

For purposes of brevity the pseudo random sequence encoded vertical synchronizing signals, shown as signal portion 21' in FIG. 4 will also be referred to herein simply as the PRS signal.

Figure 2:
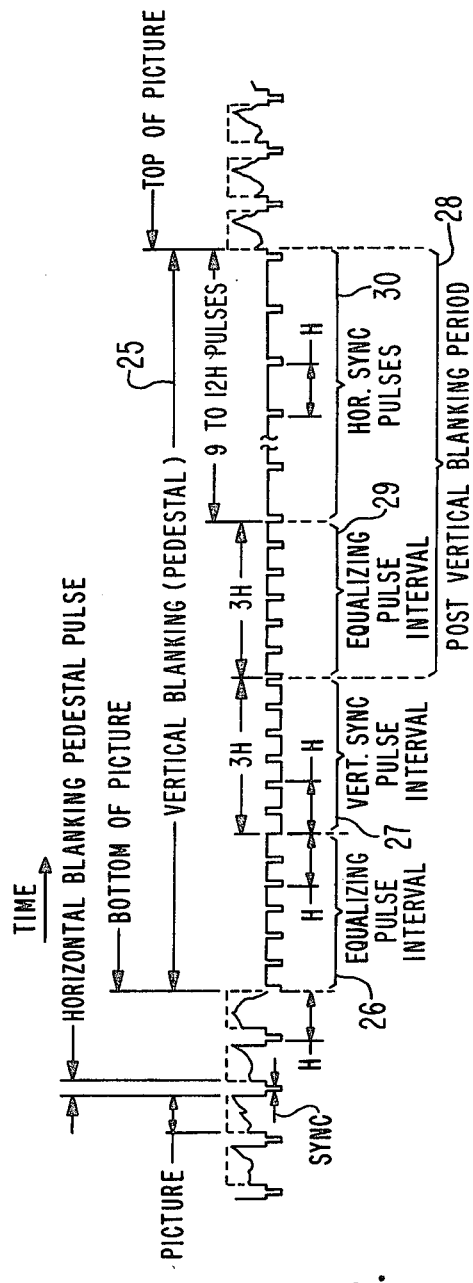
FIG. 2 is a waveform showing a standard television signal with equalizing pulses.
Figure 3:
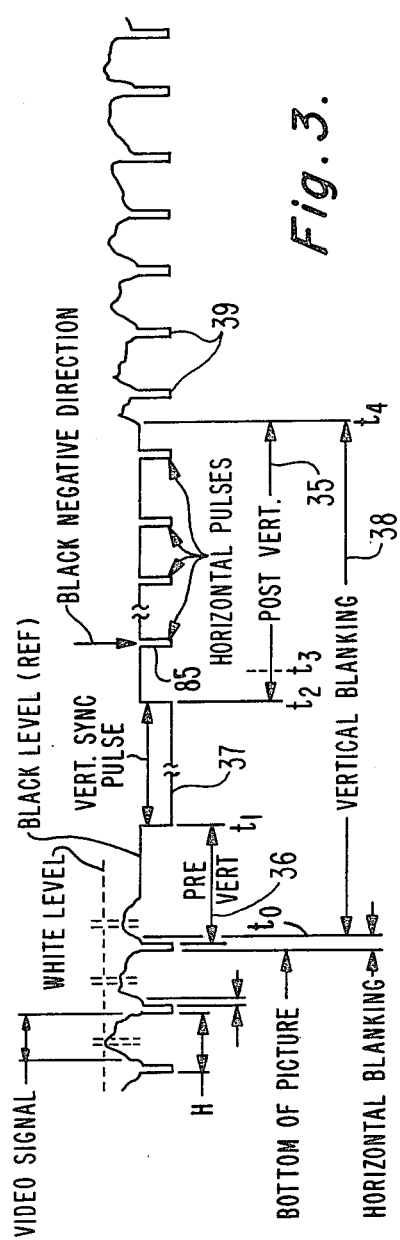
FIG. 3 is another waveform showing a type television signal commonly employed in military applications and having no equalizing pulses.

The various other portions of the signal shown in FIG. 2, as well as the signal of FIGS. 3 and 8, are identified in the figures. For example, the equalizing pulse interval, the pre-vertical, vertical and post vertical synchronizing pulse intervals, the video portion, and the horizontal synchronizing pulse intervals are all labelled in one or the other of FIGS. 2, 3 and 4.

FIG. 3 shows the waveform of another type of television signal which does not contain equalizing pulse corresponding to the equalizing pulse intervals 26 and 29 of FIG. 2. Such systems are sometimes employed in closed circuit television and in governmental usages.

In the type television signal shown in FIG. 3 the 4096 code chip pseudo random sequence occurs during the post vertical blanking period 35 of FIG. 3. In FIG. 3 the prevertical blanking period is designated by reference character 36, the vertical sync pulse period by reference character 37, and the total vertical blanking period by reference character 38. Two of the horizontal synchronizing pulses are designated by the same reference character 39.

In FIG. 4 there is shown in more detail the shape and position of the PRS signal in the total vertical blanking period 40 which consists of the sum of the prevertical portion, the vertical synchronizing portion, (plus one horizontal line period) and the post-vertical portion 21. It is during the post-vertical blanking period 21 that the PRS signal is inserted into the video signal. This PRS signal 21 which consists of 4096 code chips generated at a chip rate of 4.032 million chips per second occupies a time period equivalent to 16 horizontal lines of scanning. Horizontal blanking periods 43 and 44 are also shown in FIG. 4 as well as video portions 45, 46, and 47.

Referring now to FIG. 5 there is shown a more detailed combination block and logic diagram of the transmitting portion of the system. The conventional composite video with conventional vertical and horizontal sync pulses is supplied to a buffer amplifier 50 and separated into two circuit paths as discussed generally re FIG. 1. The upper path of FIG. 5, including sync separator logic 51 and vertical sync integrator logic 56, and certain following logic to be discussed below, functions to separate and process both vertical and horizontal synchronizing pulses and to replace such synchronizing pulses with a single vertical synchronizing signal consisting of the PRS signal defined above.

The lower path includes synchronizing pulse stripper logic 52 which functions to remove the vertical and horizontal synchronizing pulses from the composite video and then to output the stripped video signal which is later combined with the new PRS encoded vertical synchronizing pulse as will be described below.

Consider first, the separation and processing of the synchronizing pulses. The synchronizing separator circuit 51 outputs the conventional composite synchronizing pulses, including both the vertical and horizontal synchronizing pulses, but does not include the video portion of the signal. Vertical synchronizing integrator 56 then responds to the wide vertical synchronizing pulse portion 37 of FIG. 3 to produce an output voltage exceeding the threshold reference voltage source 70 of FIG. 5. A threshold device 57 will output that portion of the output of the vertical synchronizing integrator circuit 56 which exceeds the threshold reference voltage from source 70 and will, in fact, trigger flip-flop 60 to prime one input of AND gate 59 as soon as the output from integrator circuit 56 exceeds the threshold reference voltage from source 70. This is shown as occurring at time $t_1$ in FIG. 5A where the threshold voltage from source 70 is indicated by reference character 72 and the output from the vertical sync integrator circuit 56 is represented by waveform 73.

Thus, at time $t_1$ in FIG. 5A the threshold device 57 will output a signal which will trigger flip-flop 60 and prime one input of AND gate 59. However, it is desired, for purposes to be described later, to delay the beginning of the generation of the new PRS signal until the occurrence of the first horizontal synchronizing pulse after the vertical sync pulse 37 of FIG. 3. Accordingly, AND gate 59 is not enabled at time $t_1$ in FIG. 5A, only primed.

To accomplish the foregoing the INVERTER 58 responds to the output of threshold device 57 at time $t_1$ (FIG. 5A) to disable AND gate 59 until time $t_3$ (FIG. 5A) when the output of vertical sync integrator 56 has decreased to a value below the threshold reference voltage 70, which occurs shortly after the termination of the vertical sync pulse at time $t_2$ (FIG. 3), but before the occurrence of the first horizontal pulse 85 and the post-vertical blanking period 35. The pulse 85 is also shown in FIG. 5A.

The reason for delaying the initiation of the generation of the PRS signals until the first horizontal pulse 85 occurs, (FIG. 3), is that in many composite television signals (such as standard NTSC) the vertical sync pulse will have equalizing pulses as shown in the waveform of FIG. 2. Such equalizing pulses result in the small peaked occurrences in the waveform 73 of FIG. 5A, such as the peaked occurrence 76, 77, 86, and 87, any of which might trigger the generation of the PRS signal at an incorrect time. Consequently, it is desired to delay the generation of the PRS signal until after the occurrence of the conventional vertical sync pulse portion 37. At time $t_3$ (FIG. 3) the output of threshold device 57 (FIG. 5) will decrease to its low level so that the output of INVERTER 58 will be at its high level, thereby enabling AND gate 59 to permit the remaining composite sync signal to be supplied via lead 69 through AND gate 59 to the input of flip-flop 61.

The first pulse supplied to AND gate 59 will be the horizontal synchronizig pulse 85 of FIG. 3 occurring immediately after the vertical sync pulse 37 and will function to cause the Q output of flip-flop 61 (FIG. 5) to go high, thereby enabling AND gate 64 to allow the output of crystal oscillator 62 to pass through divide-by-two divider 63 and then through AND gate 64 to initiate the generation of the PRS signal in the following manner. The 4.032 MHz output from divider 63 is supplied to three destinations, including the $2^{12}$ counter 65 and the PRS reference code generator 66 through AND gate 64, and directly to the reference code load logic means 67 through lead 81.

The counter 65 has a count capacity of 4096 which determines the number of code chips in the PRS signal to be employed as the vertical synchronizing signal. A 32 bit number is loaded into PRS reference code generator 66 from code storage switches 68 through reference code load logic 67.

The PRS reference code generator 66 is loaded with a 32-bit code variable having initial conditions from code switches 68 each time the counter 65 reaches its capacity to output a load start pulse on lead 80. Such load start pulse energizes reference code load logic 67 to supply the contents of code storage switches 68 into PRS reference code generator 66 under control of 4.032 MHz clock pulses from divider 63 supplied to reference code load logic 67 via lead 81.

Assume that the PRS reference code generating logic 66 contains the proper PRS reference code variable and starting conditions when AND gate 64 becomes enabled. The clock pulse output from divider 63 simultaneously will cause the counter 65 to count from 0 towards its capacity of 4096 and the code generator 66 to generate the 4096 code chip PRS signal which is supplied to analog gate 55 via lead 90.

When counter 65 reaches its capacity of 4096, a pulse will be outputted therefrom on lead 80 which will perform several functions. Specifically, the pulse on lead 80 will cause PRS code generator 66 to again be loaded with the code parameters stored in switches 68 through reference code load logic 67 under control of, and at the rate of, the 4.032 MHz clock pulses supplied to load logic 67 via lead 81. The output of counter 65 will also function to reset flip-flops 60 and 61 via leads 80 and 91.

During the time the PRS signal is being generated by code generator logic 66 and being supplied to analog gate 65, the Q output of flip-flop 61 is high so that analog gate 55 is enabled via lead 93 to pass the generated PRS signal from code generator 66 through analog gate 55 to summing logic 54 where it is combined with the stripped video signal from analog gate 53.

When flip-flop 61 is reset by the output of pulse from counter 65, the Q output of flip-flop 61 goes low and the $\bar{Q}$ output goes high to enable analog gate 53 so that the video portion from sync stripper 52 will pass through said analog gate 53 and into summer 54.

The flip-flop 60 is also reset by the output from counter 65, as discussed above, in preparation for the reception of the next conventional vertical sync pulse. When such next vertical sync pulse occurs the flip-flop 60 is again triggered to prime one input of AND gate 59. The INVERTER 58 inverts the output of threshold device 57 to inhibit AND gate 59 until the vertical sync pulse terminates, as discussed above. In other words, the cycle repeats in the manner described above. It should also be noted that the resetting of flip-flop 60 at the end of the generation of the PRS signal 21 of FIG. 4 will inhibit AND gate 59 (FIG. 5) and prevent any of the subsequent horizontal sync pulses from passing through AND gate 59 until the occurrence of the next conventional vertical sync pulse which will then allow only the first following horizontal pulse through AND gate 59 in the manner described above.

Thus, the only synchronizing signals contained in the resulting composite video outputted from summer 54 are the pseudo random sequence (PRS) encoded vertical synchronizing signals. The resulting composite video signal contains no horizontal synchronizing pulses.

It will be noted that the first conventional vertical synchronizing pulse received when transmission is first initiated does not result in a generated PRS signal since at least one fill-up of counter 65 is required in order to load the PRS reference code generator 66 with the code parameters stored in code store switching means 68. However, after the reception of the first conventional vertical synchronizing pulse, the PRS reference code generator 66 will subsequently always be loaded following the reception of a conventional vertical sync pulse, and the generation of a PRS signal in code generator 66 will occur.

The new composite video signal from summer 54 is supplied to transmitter 18 where it is modulated upon a suitable carrier and transmitted via antenna 19 to a receiver which is shown in FIG. 7.

Before discussing the logic of the receiver of FIG. 7, a general discussion of the manner in which the received PRS signals can be divided into blocks for purposes of minimizing receiver processing hardware will be discussed.

It is possible to detect the received encoded vertical sync pulses by correlating the received PRS signal with a locally generated PRS signal of 4096 code chips which has a pattern identical with that of the received PRS signals. It is also possible to divide each 4096 code chip reference PRS signal into blocks of code chips, selected ones of which are then correlated against corresponding blocks of the received PRS signal. For example, the 4096 code chip PRS signal can be divided into 8 blocks, each consisting of 512 code chips. This is true of both the received PRS signal and the PRS signal locally generated at the receiver. With such an arrangement the register for receiving the input signal consists of 512 stages as does the register for storing the corresponding block of the locally generated PRS signal. The correlator which compares the input and reference signals can also have 512 stages.

Assume that the 8 blocks of 512 code chips are labelled 1 through 8. Further assume, as an example, that the third block of 512 chips of the locally generated PRS signal is stored in the PRS reference signal register. Then, when the corresponding third block of 512 code chips of the received PRS signal are present in the 512 stage input signal register, correlation will occur and an output pulse indicating such correlation will be generated.

From time to time the selected block of 512 code chips can be changed either by an operator or by suitable random signal generating means thereby making jamming of a selected block of 512 code chips out of the total 4096 code chips from a hostile transmitter difficult. However, the changing of blocks to be correlated results in a jitter effect in the train of generated correlation pulses so that they cannot be employed directly to regenerate the conventional vertical and horizontal sync pulses required for combination with the video portion of the received signal to form a conventional composite video signal. Accordingly, the receiver logic must correct for this jitter effect. Such logic has been incorporated into the receiver of FIG. 7 which will be described later.

FIG. 6 illustrates the division of a PRS signal into 8 blocks. More specifically, the composite video waveform 100 shown in bar form at the top of FIG. 6, has two vertical blanking periods 113 and 114 with a video portion 115 therebetween. The vertical blanking periods 113 and 114 occur at the standard 60 Hz frame rate of conventional television receivers. The bar waveform 101 shows an expanded version of the vertical blanking period 114 of signal 100. Specifically, signal 101 shows a typical pre-vertical period 103, a vertical sync pulse period 104 and the post-vertical period 102 which contains the 4096 code chip PRS signal. The 4096 code chips PRS signal is divided into 8 blocks, each containing 512 code chips. The signal 105 shows an enlarged view of the post-vertical period 102 of signal 101 and specifically shows a typical waveform of the PRS signal. For example, pulse 108 represents one code chip. The low level period 109 also represents one code chip. The pulse 110 represents three code chips and pulse 111 represents one code chip. The total number of code chips is 4096.

In FIG. 7 the composite video with the PRS signal is supplied from source 202 through AND gates 203 and 204, when enabled, to late video input signal register 211 and early video input signal register 212, respectively. The two AND gates 203 and 204 are alternately primed from the output of divide-by-2 circuit 260 which is connected to a 8.064 MHz output crystal oscillator 200 through start switch 201, when closed. Thus, the frequency of the signals supplied to each of AND gates 203 and 204 is 4.032 MHz. The video signal is supplied to early and late input signal registers 212 and 211 in pulse form because of the alternate enabling of AND gates 203 and 204 by the output signal from divider 260.

The two video input signal registers 212 and 211 are shift registers and can be either charge coupled devices (CCD's), or they can be combined with digitizers (not shown in FIG. 7) which translates the video input signal into binary 1's and 0's. If CCD devices are employed AND gates 203 and 204 will be TRANSMISSION gates.

A reference signal has previously been generated by reference signal generating source 215 and entered into reference signal register 213. Specifically, the reference signal generating source 215 generates a 4096 code chip PRS signal having a pattern identical to that of the 4096 code chips of the received PRS signal, and at a 4.032 MHz rate determined by the 4.032 MHz clock pulse supplied from divider 260 through lead 262 and AND gate 263, when enabled, to the input of reference signal generator source 215.

As discussed above, however, at any given time only one block of 512 code chips of the 4096 total code chips of the PRS signal is employed as a reference signal to be stored in reference signal register 213. The selection of one of the eight 512 code chip blocks is determined by logic within the dotted block 230 which outputs a 4.032 MHz block selecting signal on lead 217. Such block selecting signal inhibits AND gate 263 after the entry of the selected block of 512 code chips has been generated and entered into reference signal register 213. For example, if 1024 pulses of the 4.032 MHz clock have been supplied to reference signal generating source 215 the second block of 512 code chips will be stored in reference signal register 213, the first block of 512 code chips having passed completely through register 213.

The logic within dotted block 230 not only functions to select the particular block of 512 code chips to be used as a reference signal but also functions to correct for the jitter that otherwise would occur in the detected vertical sync pulses as a result of changing blocks and thereby producing correlation pulses at irregular intervals rather than at a constant 60 Hz rate.

The details of the logic within block 230 will be discussed in detail later herein.

Returning again to the correlator means within dotted block 210, the early and late video input signals entered into early and late input signal register 212 and 211 are constantly compared with the reference PRS signal in register 213 by means of correlators 206 and 215. When a correlation pulse occurs it is supplied to two sets of circuits. One of these sets of circuits includes TRANSMISSION gates 221 and 222 which receive, respectively, the outputs of correlators 215 and 206. If the other inputs of TRANSMISSION gates 221 and 222 are primed at this time, correlation indicating signals will be outputted from TRANSMISSION gates 221 and 222 to voltage summer 223 and having amplitudes which depend upon the degree of phase coincidence between the PRS signals of the early and late video signals and the reference PRS signal in register 213. If a symmetrical timing relationship exists between the reference PRS signal in register 213 and the received PRS signals in registers 211 and 212, the correlation pulses generated by correlators 206 and 215 will be equal so that outputs of TRANSMISSION gates 221 and 222 will also be equal.

The output signals from correlators 215 and 206 are also supplied to late and early sample-and-hold circuit 235 and 236, respectively, which are energized by output pulses from transmission gates 221 and 222, respectively, to sample and hold the correlation pulses.

The output signals of the late and early sample and hold circuits 235 and 236 are supplied to difference amplifier 237, and then through error switch signal 238 when it is energized by a gating signal supplied via signal lead 218 from the logic within block 251. Such gating signal indicates that a sufficient percentage of vertical synchronizing pulses have been verified to conclude that acquisition of synchronization with the received PRS signals has occurred. The logic of block 251 will be discussed in detail later.

From error signal switch 238 the signal is supplied through low pass filter 240 and to crystal oscillator 200 via lead 241 to correct the phase of the crystal oscillator 200 output to a symmetrical relationship between the PRS signals of the late and early sampled input video signals and the reference signal in reference signal register 213. As will be discussed later, TRANSMISSION gates 221 and 222 are primed by gating pulses supplied via lead 232 from the logic within dotted blocks 230 and 231 to pass correlation pulses when they occur. Such priming of TRANSMISSION gates 221 and 222 occurs only during the short time intervals that a correlation pulse is expected.

An exception to the foregoing occurs when operation is first initiated. The two TRANSMISSION gates 221 and 212 are primed from the initiation of operation so that they will be certain to pass the first occurring correlation pulse which then functions to reset counters 269 and 270 to predetermined values, thereby initiating a 60 Hz output signal from AND gate 359 on lead 358. Such output signal is employed to identify the beginning of the conventional vertical sync pulses which will be generated and reinserted into the video signal by means shown in FIG. 8, which will be discussed in more detail later. It should be noted that dividers 269 and 270 function to divide the 4.032 MHz input supplied to divider 269 to produce the 60 Hz field rate output from divider 270.

Returning again to the initiation of operation of the receiver the first occurring correlation pulse is supplied to summer 223 from TRANSMISSION gates 221 and 222. The output of summer 223 functions to reset flipflop 224 which, at the start of operation, had been set by start reset pulse from source 226. When reset by the first correlation pulse, and assuming the 8th block of code chips are employed for initial correlation, flip-flop 224 will reset dividers 269 and 270 to zero count. Use of the 8th block of 512 code chips results in the correlation pulse occurring at the end of the 4096 code chip of the PRS signal.

Since the exact position of the zero count of dividers 269 and 270 is now known with respect to the incoming PRS signal it is possible to select any of the eight 512 code chip blocks of the 4096 code chip RPS signal by detecting selected counts of divide-by-512 divider 270. Such selected counts are supplied through OR gate 280 and AND gate 281 to enable TRANSMISSION gates 221 and 222 at the proper time to pass an expected correlation pulse. The duration of such gating pulses derived from the output of divider 270 is determined by selecting two counts from divider 269, which determines the beginning and end of a continuous pulse generated in pulse generator 198, and supplying such pulse along with the output from OR gate 280 to AND gate 281. The pulse width is determined by the specified start and finish counts. The pulse repetition rate is 31,500 pulses per second. AND gate 281 selects the desired 60 per second block selection pulses. The selected pulses depend on the code block selection. The count from divider 270, which is selected by the logic of block 230, determines the beginning of the resultant gating pulse and thereby selects the particular block of the 8 blocks of the 512 code chips.

Returning again to the initial operation of the receiver of FIG. 7, after flip-flop 224 is reset additional correlation pulses from summer 223 have no effect upon the dividers 269 and 270. It is only when some event occurs to set flip-flop 224 that the following correlation pulse from summer 223 will reset flip-flop 224 to again reset dividers 269 and 270 to their zero counts.

After the reception of the first correlation pulse from summer 223, a test must be made to determine if such pulse was in fact a true correlation pulse. Such test involves the counting of a predetermined number of next expected correlation pulses actually received. Such verification of PRS signal synchronization is effected by logic within dotted block 251 where it is determined that at least 7 actual correlation pulses occur in the next 15 expected correlation times. The output from summer 223 is supplied to a divide-by-8 counter 290, initially set to zero. The 60 Hz output signal appearing on lead 232 from the logic within dotted block 231 is supplied to divide-by-16 divider 291 which was originally set to zero by flip-flop 296. More specifically flip-flop 296 is initially reset by an output from start reset pulse source 294 which in turn resets dividers 290 and 291 to zero.

Divider 291 will receive a pulse every expected correlation time. The divider 290 however will receive a pulse only upon the occurrence of an actual correlation pulse appearing at the output of summer 223. If divider 290 reaches its capacity before divider 291, the output of voltage comparator 292 will be a positive pulse. On the other hand, if divider 16 reaches its capacity before divider 290, then the output of voltage comparator 292 will be a negative pulse which will be inverted by inverter 295 to a positive pulse which will reset flip-flop 296 through OR gate 293. The resetting of flip-flop 296 indicates the failure to obtain PRS synchronizing acquisition and will reset dividers 290 and 291 to zero so that the testing process can begin anew.

The resetting of flip-flop 296 also functions to set flip-flop 224 in gating logic block 220 through OR gates 313 and 225, thereby providing an output to OR gate 284 which will continuously prime TRANSMISSION gates 221 and 222 until the occurrence of the next vertical or correlation pulse, thus recreating the same conditions that existed at the time operation of the system was first initiated. When the next correlation pulse occurs to produce an output from summer 223 the flip-flop 224 is reset which in turn resets dividers 269 and 270 to zero.

Once acquisition of the received PRS signal is obtained, the output of flip-flop 296 enables error signal switch 238 via lead 297 to complete the phase lock loop back to crystal oscillator 200 through low pass filter 240 and lead 241. The signal appearing on output lead 219 from divider 270 is a 60 Hz clocking pulse train with a pulse occurring at the end of every PRS signal of the received composite video signal. Such 60 Hz clocking signal is supplied to the phase detector 370 of FIG. 8 as will be discussed later.

Even after acquisition of the received PRS signal has occurred, it is possible to lose it. Therefore, logic is provided to make a second, continuous test of the percentage of PRS signals actually received and detected. Such logic is shown within dotted block 250 of FIG. 7 and operates in a manner similar to the logic within block 251 but with a different percentage of verified received PRS signals required. More specifically, the correlation pulses resulting from PRS signals actually received are supplied to the count-down input 315 of up/down counter 310, which was originally set to zero at the initiation of operation of the receiver by means of a reset pulse supplied through OR gate 314 from reset pulse input lead 312. The 60 Hz output from divider 270 is supplied through AND gate 359 and then through primed AND gate 299 to divide-by-four divider 300. AND gate 299 is primed since flip-flop 296 is set as a result of the acquisition of synchronization with the received PRS signal. Thus, up/down counter 310 will count up one for every four expected correlation pulses and will count down one for every verified correlation pulse. When the up/down counter counts up to 62 a pulse is supplied through OR gates 313 and 293 to reset flip-flop 296, thereby indicating that synchronization with the received PRS signal has been lost.

In order to prevent the counter 310 from counting downwardly from its reset to 0 condition to 62, which would occur as a result of two consecutive correlation pulses immediately after acquisition of synchronization, the counter 310 is reset to 0 each time the count reduces from 0 to 63, thus preventing the counter from counting down below 63 from its reset to zero condition. However, after counter 310 has counted up to a count of 1 of more than it will decrement one count for each generated correlation pulse.

Upon loss of acquisition, evidenced by an output pulse being supplied from counter 310 through OR gates 313 and 293 to reset flip-flop 296, the dividers 269 and 270 will be reset to zero, thereby establishing the initial starting conditions required to again attempt to obtain acquisition of synchronization with the received PRS signals.

At various points in the above description, the function of the logic within dotted block 230 has been referred to as selecting a given one of the eight blocks of 512 code chips for storage in reference signal register 213, and also to correct for the jitter or asynchronous timing that occurs when the selected block is changed, thereby insuring that a constant 60 Hz signal is outputted to the phase detector 370 of FIG. 8 at all times.

In the operation of the logic within block 230, the 4.032 MHz signal from divide-by-2 divider 260 is supplied to one terminal of AND gate 263 which, as will be seen later, is primed by a low level signal being supplied to the inhibit input thereof. The 4.032 MHz signal is supplied through AND gate 263 to counter 264 which divides by 512. Thus, after every 512 clock pulses of frequency 4.032 MHz the divider 264 will supply an output signal to 1 to 8 counter 265.

Any one of the eight counts of counter 265 can be selected by count select controls means 266 which can be controlled either by an operator or by suitable random signal generating means which will randomly select one of the counts 1 through 8 of counter 265.

Assume that count select control means 266 has selected the count of 2 so that when counter 265 contains a count of 2 the count select control means 266 will supply such count of 2 signal to bus 267. The count of 2 output signal from count select control means 266 is supplied both to gating network 268 and through OR gate 320 back to the inhibit input terminal of AND gate 263, thereby preventing further clock pulses from passing through said AND gate 263. The total number of clock pulses that have passed through AND gate 263 to produce a count of 2 in counter 265 is 1024. These 1024 4.032 MHz clock pulses are supplied to reference signal generating source 215, thereby generating the first 1024 code chips of the total 4096 code chip PRS signal. Thus, the second block of 512 code chips is entered into and remains in 512 stage signal register 213.

The count of 2 supplied through OR gate 320 from control means 266 also resets reference signal generating means 215 via lead 199 to its initial condition in preparation for a new block of 512 code chips to be entered into reference signal register 213.

The selected count of 2 signal outputted from count select control means 266 is further supplied to gating network 268 which functions to select a given count of divider 270, thereby determining which block of 512 code chips of the received PRS signal will be selected. Worded in another way, the selected count of divider 270 will be such that it will occur at the same time as the expected correlation pulse resulting from correlation of the second block of reference PRS signal with second block of the received PRS.

The counts of dividers 269 and 270 that determine which block of 512 code chips is to be selected from the incoming PRS signal are determined in the following manner. As discussed above, counters 269 and 270 were originally reset to zero when the 8th or last group of 512 code chips was employed as the reference signal to produce correlation with the 8th block of 512 code chips of the received PRS signal. Since the 8th block of code chips of the received signal is the last block to be received, correlation will occur at the end of the received PRS signal. Thus, both counters 269 and 270 are initially reset to zero at the end of the received PRS signal.

Since each block of code chips is 512 code chips long, the divide-by-128 divider 269 must count to its capacity four times in order to enter a block of 512 code chips into input signal registers 211 and 212. More specifically, divider 269 is clocked by the 4.032 MHz clock pulse which also clocks the received video signal into input signal registers 211 and 212. Thus, it requires 512 counts of divider 269 to enter one block of code chips into registers 211 and 212.

The timing of the gating pulse from AND gate 281 is such that TRANSMISSION gates 221 and 222 will be enabled coincident with the reception of the selected block of code chips which is determined by selecting a particular count of the divider 270. As discussed above, the 8th block of code chips of the received signal will be present in input signal registers 211 and 212 at the count of 0 of divider 270. Since four complete count cycles of divider 269 are required for the entry of each block of code chips into input registers 211 and 212, it follows that at the count of 521 of counter 270, 4 less than the count of 0, the 7th block of code chips will be present in registers 211 and 212. At the count of 517 of divider 270 the 6th block of code chips will be present in register 211 and 212.

The foregoing can better be understood by reference to FIG. 6, where that portion 102 of the signal represented by bar 101 represents the time interval in which the 4096 code chip PRS signal is generated and is present in the received composite video signal. It can be seen that the PRS signal is divided into 8 blocks, each consisting of 512 code chips. Immediately above the portion labeled "POST VERTICAL PERIOD" there are a series of numerals representing the counts of divider 270 of FIG. 7 at which the various ones of the 8 blocks of 512 code chips will be selected. For example, at the count of 497 of divider 270 of FIG. 7, the first block of code chips will be selected; at the count of 501 of divider 270 the second block of 512 code chips will be selected; at the count 0 the 8th block of 512 code chips will be selected, and so on. Time is represented as increasing to the left in FIG. 6.

Assume, as an example, that the third block of 512 code chips is to be employed as the reference signal so that the gating pulse from AND gate 281 must enable TRANSMISSION gates 221 and 222 during the reception of the third block of 512 code chips of the received PRS signal. From FIG. 6 it can be seen that the selected count of divider 270 required to produce an output signal in synchronism with the received third block of 512 chips must be 505.

Simultaneously, with the occurrence of the 505 count of counter 270 (FIG. 7) a pulse is generated in pulse generator 198 which is responsive to the count of divider 269 to begin at the count of 0 of divider 269 and to terminate at the count of 7 of divider 269. Thus, a gating pulse is outputted from AND gate 281 which begins at the 505 count of divider 270 and the 0th count of divider 269 and lasts through the 7th count of divider 269. This pulse is equal to 8 periods of the 4.032 MHz clock pulse. The width of such gating pulse can be varied by changing the duration of the pulse generated by pulse generator 198. For example, such pulse width can be doubled by generating a pulse which extends from a count of 0 to the count of 15 of divider 269.

The output from AND gate 281 is supplied through OR gate 284 and lead 232 to prime TRANSMISSION gates 221 and 222 for approximately a 2 microsecond period during which the correlation pulse is expected to occur.

The dividers 269 and 270 will both continue to count continuously. Thus divider 270 will reach a count of 525 and will then reset itself to zero, thereby identifying the end of the 4096 code chip period which occurs at times $t_4$ and $t_3$ in FIGS. 3 and 4. By selecting the proper counts of dividers 269 and 270 the time $t_0$ in FIG. 3, which marks the start of the conventional vertical blanking periods, can be identified. These selected coincident counts from dividers 269 and 270, which form a train of pulses occurring at the field rate of 60 pulses per second, are supplied through AND gate 259 to one input of phase detector 370 of FIG. 8.

A second 60 Hz signal, derived from the 504 kHz voltage controlled oscillator 373 of FIG. 8 is supplied to a second input of phase detector 370. The derivation of the second 60 Hz signal is obtained from the 504 kHz voltage controlled oscillator 373 the output of which is supplied to encoding logic 380 and is also divided by divide-by-16 divider 373 to produce a 31.5 kHz signal. The 31.5 kHz signal is twice the line frequency of the standard television horizontal scanning rate.

The 31.5 kHz signal in turn is divided by divide-by-525 divider 374 to produce a 60 Hz signal which is supplied to encoding logic 380 as well as to phase detector 370. Phase detector 370 functions to generate a dc output signal which is supplied to low pass filter 375, the output of which is then supplied back to voltage controlled oscillator 373. Thus, the 60 Hz signal supplied to input terminal 381 of phase detector 370 is maintained precisely in phase with the 60 Hz signal supplied to input terminal 358 of phase detector 370. Since the phase of the 60 Hz signal appearing on input terminal 381 is maintained precisely, the phase of the 31.5 kHz signal supplied to encoder 380 from divider 373 is also precisely controlled.

Encoder 380 contains well known logic for generating conventional horizontal and vertical synchronizing pulses with or without equalizing pulses for reinsertion of such synchronizing pulses into the video signal. The generated conventional vertical and horizontal sync pulses and equalizing pulses, if required, are supplied to the synchronization reinsertion circuit 362 where they are recombined with the base band video signal received via antenna 360 and supplied from video receiver 361.

The base band video signal is supplied to reinsertion circuit 362 through lead 387, transmission gate 386, and lead 363. Transmission gate 386 can be employed in conjunction with a flip-flop 385 to remove the PRS signal from the received base band. The removal of such PRS signal is accomplished by inhibiting gate 386 between the counts 493 and 0 of divider 270 of FIG. 7, which is the time interval during which the transmitted PRS signal is received.

More specifically, flip-flop 385 is set at count 493 of divider 270 to inhibit the passage of the video signal through transmission gate 386 and then, at the count 0 of divider 270, which is supplied to input 384 of flip-flop 385, the flip-flop 385 is reset to enable transmission gate 386 and permit transmission of the received video signal therethrough to the sync reinsertion circuit 362.

Thus, the entire conventional vertical and horizontal synchronizing signal including the post-vertical portion thereof is reinserted into the received video signal in reinsertion circuit 362 to conform to industry standards and then supplied to video display and/or recording means 390.

What is claimed is:

1. In a television system comprising:
transmitter means comprising first logic means for generating and transmitting a video signal whose synchronizing signals consist solely of encoded signals occurring only during a predetermined portion of the vertical blanking periods of said video signal and containing information from which both conventional vertical and horizontal synchronizing signals can be derived; and
receiver means comprising second logic means responsive to said encoded signals in said video signal to generate conventional vertical and horizontal synchronizing signals and to insert said generated conventional vertical and horizontal synchronizing pulses into said video signal in lieu of said encoded signals to form a composite video signal.

2. A television system as in claim 1 in which each of said received encoded signals is comprised of N blocks of X code chips, where N and X are both integers and in which said second logic means comprises:
means for generating reference encoded signals each having the same pattern as said received encoded signals;
third logic means comprising correlating means for correlating selectable blocks of code chips of said reference encoded signals with said received encoded signals to produce output correlation pulses;
means for generating a train of clock pulses;
frequency divider means responsive to said train of clock pulses to produce a second train of clock pulses having a repetition rate equal to the vertical synchronizing pulse rate of said video signal;
fourth logic means responsive to the correlation of a known block of code chips of said reference encoded signals with the corresponding block of code chips of said received encoded signals from initial conditions at the initiation of operation of said television system to cause said second train of pulses to assume a known phase relation with said received encoded signals;
said third logic means further responsive to each repetition of a predetermined count of said frequency divider means to generate a gating pulse which coincides with the occurrence of that block of code chips of the received encoded signals which corresponds to the selected block of code chips of said reference encoded signals; and
fifth logic means responsive to the coincident occurrence of said gating pulses and the output correlation pulses of said correlating means to produce correlation verifying pulses.

3. A television system as in claim 2 and further comprising:
second means for determining the ratio of the number of correlation verifying pulses to the number of expected correlation pulses over a predetermined time period; and
third means responsive to said ratio exceeding a predetermined value to indicate acquisition of synchronization of said received and reference encoded signals to enable continuation of operation of said television system and further responsive to said ratio not exceeding said predetermined value to return said television system to the initial starting conditions to again attempt to acquire synchronization of said received and reference encoded signals.

4. A television system as in claim 2:
in which said third logic means further comprises second counting means for controlling the entry of said selectable block of code chips of said reference encoded signals into said correlating means; and
in which said third logic means further comprises gating means responsive to the counts of said first and second counting means to generate said gating pulses.

5. A television system as in claim 1 in which said second logic means comprises:
means for generating reference encoded signals having the same pattern as said received encoded signals;
correlating means for correlating said received encoded signals with said reference encoded signals to produce a correlation pulse at each correlation;
third logic means comprising means for generating a phase variable train of clock pulses having a repetition rate equal to the field rate of said video signal;
said third logic means further responsive to the initial correlation pulses, after operation of said television system has begun from initial starting conditions, to alter the phase of said train of clock pulses to have a known phase relationship with said received encoded signals and to generate a train of gating pulses coincident with the expected times of correlation between said received and reference encoded signals;

fourth logic means responsive to said gating pulses and said correlation pulses to verify the acquisition and maintenance of correlation between said received and reference encoded signals; and fifth logic means responsive to the phase altered train of clock pulses and to said received video signal to insert conventional vertical and horizontal synchronizing signals into said received video signal to produce a conventional composite video signal.

6. A television system as in claim 5 in which said fourth logic means comprises:

first means for determining the ratio of the number of correlation pulses actually detected to the number of expected correlation pulses over a predetermined time period; and sixth logic means responsive to said ratio exceeding a predetermined value to indicate acquisition of synchronization of said received and reference encoded signals to enable continuation of operation of said television system and further responsive to said ratio not exceeding said predetermined value to return said television system to said initial starting conditions to again attempt to acquire synchronization of said received and reference encoded signals.

7. In a television transmitting and receiving system having means for generating a conventional composite video signal having conventional vertical and horizontal synchronizing signals and comprising:

transmitting means comprising means for stripping the conventional vertical and horizontal synchronizing signals from said conventional composite video signal;

said transmitting means further comprising code signal generating means for generating pseudo random sequence (PRS) code signals and inserting said code signals into said stripped video signal at times corresponding only to the occurrences of a predetermined portion of the vertical blanking periods of said video signal to produce an encoded video signal;

said receiving means comprising decoding means responsive only to the occurrences of the code signals in said encoded video signal to produce a train of output pulses having a known time relationship with said vertical and horizontal synchronizing pulses; and first logic means responsive to said train of output pulses and said received video signal to generate and insert conventional vertical and horizontal synchronizing pulses into said received encoded video signal in lieu of said code signals to produce a conventional composite video signal having conventional vertical and horizontal synchronizing pulses.

8. A television system as in claim 7 in which said received PRS code signal is comprised of N blocks of X code chips, where N and X are both integers and in which said decoding means comprises:

means for generating a reference PRS code signal having the same pattern as said received code signal;

second logic means comprising correlating means for correlating selectable blocks of code chips of said reference code signal with said received code signal to produce correlation pulses;

means for generating a train of clock pulses;

frequency divider means responsive to said train of clock pulses and to the correlation of a known block of code chips of said reference code signal with the corresponding block of code chips of said received code signal to produce said train of output pulses having a repetition rate equal to the vertical synchronizing pulse rate of said video signal and having a known phase relation with said received code signal;

said first logic means further constructed to generate a gating pulse at each of a predetermined count of said frequency divider means that coincides with the occurrence of the block of code chips of the received code signal which corresponds to the selected block of code chips of said reference code signal; and second logic means responsive to the coincident occurrence of said gating pulses and the correlation pulses of said correlating means to produce correlation verifying pulses.

9. A television system as in claim 8 in which said second logic means comprises:

first means for determining the ratio of the number of correlation verifying pulses to the number of expected correlation pulses over a predetermined time period; and second means responsive to said ratio exceeding a predetermined value to indicate acquisition of synchronization of said received and reference PRS code signals to enable continuation of operation of said television system and further responsive to said ratio not exceeding said predetermined value to return said television system to said initial starting conditions to again attempt to acquire synchronization of said received and reference code signals.

10. A television system as in claim 8:

in which said frequency divider means comprises first counter means;

in which said first logic means further comprises second counting means for controlling the entry of said selectable block of PRS code chips of said reference code signal into said correlating means; and in which said first logic means further comprises gating means responsive to the counts of said first and second counting means to generate said gating pulses.

11. A television system as in claim 7 in which said decoding means comprises:

first means for generating a reference PRS code signal having the same pattern as said received PRS code signal;

correlating means for correlating said received code signal with said reference code signal to produce a correlation pulse at each correlation;

second logic means comprising means for generating a phase variable train of clock pulses having a repetition rate equal to the field rate of said video signal;

said second logic means further responsive to the initial correlation pulses, after operation of said television system has begun from initial starting conditions, to alter the phase of said train of clock pulses to have a known phase relationship with said received code signal and to generate a train of gating pulses coincident with the expected times of correlation between said received and reference code signals;

third logic means responsive to said gating pulses and said correlation pulses to produce correlation verifying pulse verifying the acquisition and maintenance of correlation between the received and reference code signals; and fourth logic means responsive to said altered train of clock pulses and to said received video signal to insert conventional vertical and horizontal synchronizing signals into said received video signal to produce a conventional composite video signal.

12. A television system as in claim 11 in which said third logic means comprises:

second means for determining the ratio of the number of correlation verifying pulses to the number of expected correlation pulses over a predetermined time period; and third means responsive to said ratio exceeding a predetermined value to indicate acquisition of synchronization of said received and reference PRS code signals to enable continuation of operation of said television system and further responsive to said ratio not exceeding said predetermining value to return said television system to said initial starting conditions to again attempt to acquire synchronization of said received and reference code signals.

* * * * *

UNITED STATES PATENT AND TRADEMARK OFFICE
CERTIFICATE OF CORRECTION

PATENT NO. : 4,319,273

DATED : March 9, 1982

INVENTOR(S) : Edward J. Nossen

It is certified that error appears in the above-identified patent and that said Letters Patent is hereby corrected as shown below: On the cover sheet The Inventor's name, "Nossem" should be ---Nossen---

Column 1, line 1, insert government rights paragraph:
   ---The United States Government has rights to
this invention pursuant to the terms of Contract No.
N00163-78-C-0023 awarded by the Department of the Navy.---;

Column 8, line 31, delete period (.) after "interval";

Column 8, line 63, "RPS" should be ---PRS---;

*Signed and Sealed this*

*Sixth* Day of *July 1982*

[SEAL]

*Attest:*

*Attesting Officer*

GERALD J. MOSSINGHOFF

*Commissioner of Patents and Trademarks*